United States Patent
Buchegger et al.

(10) Patent No.: US 8,533,913 B2
(45) Date of Patent: Sep. 17, 2013

(54) SPRING HINGE FOR SPECTACLES

(75) Inventors: Harald Buchegger, St. Konrad (AT); Martin Sprickler, Traunkirchen (AT)

(73) Assignee: Redtenbacher Präzisionsteile Ges.m.b.H., Scharnstein (AT)

( * ) Notice: Subject to any disclaimer, the term of this patent is extended or adjusted under 35 U.S.C. 154(b) by 0 days.

(21) Appl. No.: 13/366,451

(22) Filed: Feb. 6, 2012

(65) Prior Publication Data

US 2012/0198656 A1   Aug. 9, 2012

(30) Foreign Application Priority Data

Feb. 7, 2011   (AT) .................................. A 162/2011

(51) Int. Cl.
G02C 5/22   (2006.01)
(52) U.S. Cl.
USPC ........................................................ 16/228
(58) Field of Classification Search
USPC ........... 16/228, 229, 262, 263, 268; 351/113, 351/114, 111, 121, 153, 118, 119
See application file for complete search history.

(56) References Cited

U.S. PATENT DOCUMENTS

| | | | | |
|---|---|---|---|---|
| 4,084,889 A * | 4/1978 | Vischer, Jr. | ................... | 351/121 |
| 4,818,093 A * | 4/1989 | Tabacchi | ....................... | 351/113 |
| 4,991,258 A * | 2/1991 | Drlik | .............................. | 16/228 |
| 5,406,339 A * | 4/1995 | Chen | ............................ | 351/153 |
| 6,353,965 B1 * | 3/2002 | Lo | .................................. | 16/228 |
| 6,505,933 B2 * | 1/2003 | Schuchard et al. | ........... | 351/113 |
| 6,814,438 B2 | 11/2004 | Desbiez-Piat | | |
| 7,222,960 B2 * | 5/2007 | Thiele | ........................... | 351/153 |
| 7,637,609 B1 * | 12/2009 | Ifergan | ........................ | 351/153 |
| 7,735,193 B2 | 6/2010 | Buchegger | | |
| 2003/0067583 A1 | 4/2003 | Desbiez-Piat | | |
| 2003/0172492 A1 * | 9/2003 | Schuchard | ...................... | 16/228 |
| 2004/0237258 A1 * | 12/2004 | Montagner | ..................... | 16/228 |
| 2007/0089268 A1 * | 4/2007 | Genelot | .......................... | 16/228 |
| 2007/0192991 A1 | 8/2007 | Buchegger | | |
| 2010/0128219 A1 * | 5/2010 | Sprickler | ...................... | 351/153 |
| 2011/0016666 A1 * | 1/2011 | Wannenmacher | .............. | 16/228 |

FOREIGN PATENT DOCUMENTS

| | | |
|---|---|---|
| AT | 502 196 | 2/2007 |
| EP | 0 632 306 | 1/1995 |
| EP | 1 146 381 | 10/2001 |

* cited by examiner

Primary Examiner — Chuck Mah
(74) Attorney, Agent, or Firm — Collard & Roe, P.C.

(57) ABSTRACT

A spring hinge for spectacles is described, comprising two hinge parts (1, 2) which are connected with each other by a hinge axis (3), of which one forms a bearing bracket (4) for the other hinge part (2) which is displaceably guided in a housing (7) with the help of a sliding element (6), and comprising a coiled spring (14) which rests on a web (8) of the sliding element (6) on the one hand and on an abutment (13) fixed to the housing on the other hand, which abutment is inserted into the housing (7) through a through opening (16) in the hinge part (2) with the sliding element (6) coaxially to the coiled spring (14). In order to achieve a short overall length it is proposed that the abutment (13) comprises a sleeve (15) accommodating the hinge-side end of the coiled spring (14), which sleeve protrudes beyond the housing (7) into the region of the hinge axis (3).

4 Claims, 2 Drawing Sheets

SPRING HINGE FOR SPECTACLES

CROSS REFERENCE TO RELATED APPLICATIONS

Applicants claims priority under 35 U.S.C. §119 of Austrian Application No. A 162/2011 filed on Feb. 7, 2011, the disclosure of which is incorporated by reference.

BACKGROUND OF THE INVENTION

1. Field of the Invention

The invention relates to a spring hinge for spectacles, comprising two hinge parts which are connected with each other by a hinge axis, of which one forms a bearing bracket for the other hinge part which is displaceably guided in a housing with the help of a sliding element, and comprising a coiled spring which rests on a web of the sliding element on the one hand and on an abutment fixed to the housing on the other hand, which abutment is inserted into the housing through a through opening in the hinge part with the sliding element coaxially to the coiled spring.

2. The Prior Art

In order to ensure simple mounting conditions, it is known in spring hinges (AT 502 196 B1) to provide the bow-side hinge part with a sliding element which engages in a housing recess, which sliding element accommodates a coiled spring between two legs, which coiled spring rests on the one hand on a web connecting the two legs and on the other hand on an abutment which is screwed into a female thread of the housing which is coaxial to the coiled spring, which occurs through a coaxial through opening on the bow-side hinge part. Such a construction represents an advantageous prerequisite for a housing which is closed in the circumferential direction and which can be inserted without any difficulties from the face side into a spectacle bow. However, this leads to a comparatively long overall size as in other spring hinges because the coiled spring, which has a specific minimum length, needs to be housed together with the bow-side abutment in the housing.

SUMMARY OF THE INVENTION

The invention is therefore based on the object of providing a spring hinge in such a way that its overall length can be reduced considerably without having to make do without a sufficient travel of the spring of the coiled spring pressurizing the sliding element.

Based on a spring hinge of the kind mentioned above, this object is achieved by the invention in such a way that the abutment comprises a sleeve accommodating the hinge-side end of the coiled spring, which sleeve protrudes beyond the housing into the region of the hinge axis.

As a result of the sleeve-like abutment which protrudes beyond the housing in the direction of the hinge axis, additional space is created outside of the housing for housing the coiled spring that pressurizes the sliding element, so that the housing, which now only needs to accommodate a part of the coiled spring, can be provided with a respectively shorter configuration. The prerequisite is that the hinge axis will not obstruct this displacement of the abutment. For this reason, the hinge axis will be interrupted in the region of the protruding abutment, so that preferably two lateral axial stubs are obtained between which there will be space for the sleeve of the abutment. It would also be possible to provide only one lateral axial stub as the hinge axis. Sind as a result of the proposed measures it is merely the hinge-side support of the coiled spring which is displaced in front of the housing, the function of the hinge spring remains unaffected by the proposed measures, especially concerning the potential path of displacement for the hinge part with the sliding element.

In order to simply enable the insertion of the hinge part with the sliding element into the bearing bracket of the other hinge part, the two axial stubs which form the hinge axis can be mounted in an axially displaceable manner in the hinge part with the sliding element and can be displaceable against the force of the spring against one another into an inserted mounting position, so that for mounting it is merely necessary to push the two axial stubs which protrude beyond the middle hinge lobe into the hinge lobe in order to enable the sliding of the bearing bracket over the inserted axial stubs onto the middle hinge lobe. Once the axial stubs have reached the bearing recesses in the bearing bracket, they are pressed by way of their spring load into the bearing recesses, as a result of which the mounting process is completed. For the purpose of potential disassembly, the axial stubs must be pushed through respective openings in the legs of the bearing bracket against the force of a spring back to the mounting position.

The support of the abutment in a manner that is fixed to the housing can be achieved in many ways from a constructional viewpoint; it is only relevant that there is a displacement-proof support of the abutment relative to the housing. Especially simple constructional conditions can be obtained however when the sleeve of the abutment is screwed into a female thread of the housing which is coaxially to the coiled spring, because in this case a secure releasable anchoring of the sleeve in the housing can be ensured without having to consider the path of displacement of the coiled screw. Furthermore, a screwing adjustment of the sleeve-like abutment potentially allows setting the pretension of the coiled spring.

BRIEF DESCRIPTION OF THE DRAWINGS

The subject matter of the invention is shown in the drawings by way of example, wherein.

DETAILED DESCRIPTION OF THE PREFERRED EMBODIMENTS

Figure 1:
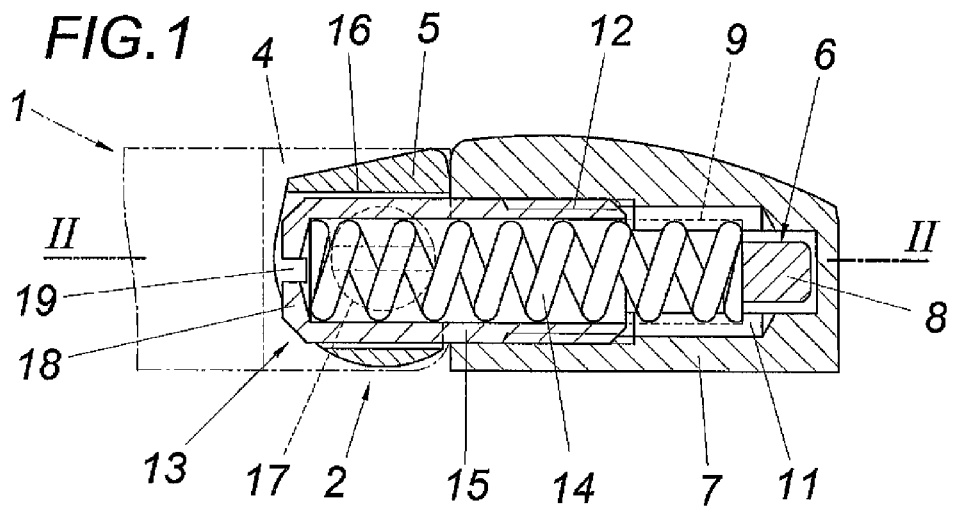
FIG. 1 shows a spring hinge for spectacles in a simplified longitudinal sectional view.
Figure 2:
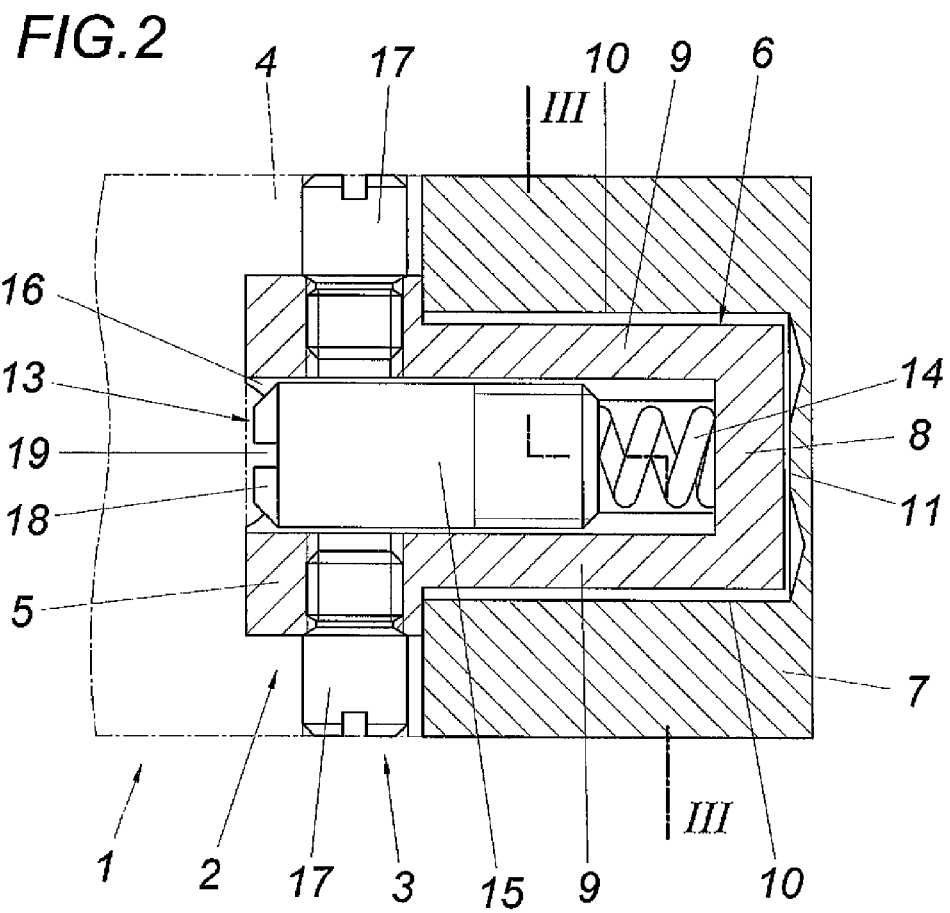
FIG. 2 shows this spring hinge in a sectional view along the line II-II of FIG. 1.
Figure 3:
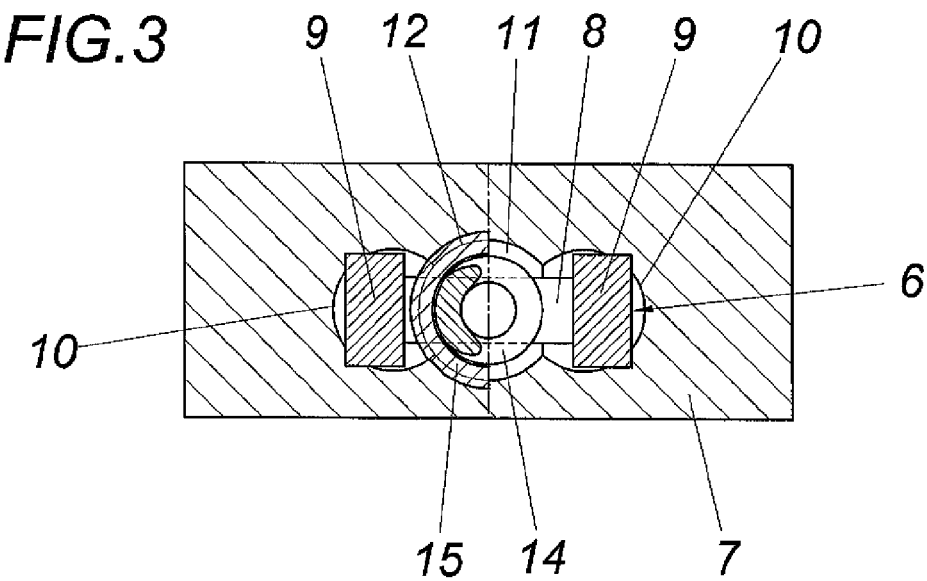
FIG. 3 shows a sectional view along the line III-III of FIG. 2.

The spring hinge according to FIGS. 1 to 3 comprises two hinge parts 1 and 2 which are associated with a bow and a cheek of a bow of spectacles, which hinge parts are connected with one another in an articulated manner with the help of a hinge axis 3. The hinge part 1 forms a bearing bracket 4, into which a hinge part 2 engages forming a middle hinge lobe 5. Said hinge part 2 carries a sliding element 6 which is displaceably guided in a housing 7 and comprises two parallel legs 9 which are connected with each other by a web 8. The recess in the housing for the displaceable guidance of the sliding element 6 is composed of two lateral guide sections 10 for the two legs 9 and an opening 11 for the web 8 connecting the two guide sections 10. For reasons of simple production, both the guide sections 10 and also the connecting opening 11 are formed by boreholes which overlap one another in the cross section, but which in the region of the guide sections 10 comprise guide recesses for accommodating in a rotation-proof manner the legs 9 which are rectangular in their cross section.

The borehole for the connecting opening 11 is provided with a female thread 12 into which an abutment 13 is screwed for a coiled spring 14, which comes to lie between the legs 9 of the sliding element 6 and which rests with its end opposite of the abutment 13 on the web 8 of the sliding element 6. The abutment 13 is arranged in form of a sleeve 15 which accommodates the hinge-side end of the coiled spring 14 and which protrudes through a through opening 16 coaxial to the coiled spring 14 in the hinge lobe 5 of the hinge part 2 beyond the housing 7, which occurs up to the region of the hinge axis 3, which for this purpose is interrupted in the region of the through opening 16 and forms two lateral axial stubs 17.

Since the bottom part 18 of the sleeve 15 which is closed on the end side is disposed in front of the housing 7 on the hinge side at a respective distance, the support of the coiled spring 14 fixed to the housing which is determined by the bottom part 18 of sleeve 15 is disposed outside of the housing 7, so that the housing 7 can be provided with a shorter configuration by the amount of the excess portion of the sleeve 15 without having to consider an influence on the length of the coiled spring or the travel of the coiled spring 14. The sliding element 6 and therefore the hinge part 2 can therefore be pulled out of the housing 7 in the same manner against the force of the coiled spring 14 as is the case in conventional spring hinges with coiled springs which are fully housed in the housing.

In order to facilitate the screwing of the sleeve 15 forming the abutment 13 into the female thread 12 of the housing 7, the bottom part 18 of the sleeve 15 can be provided with a recess 19 for the application of an actuating tool. The pretension of the coiled spring 14 can be set or changed as required by the screw-in depth of the sleeve 15. Since the sleeve 15 has a comparatively large length, advantageous constructional conditions are obtained at a respective length of the thread for such a screwing adjustment of the sleeve 15 for setting the pretension of the coiled spring 14.

Figure 4:
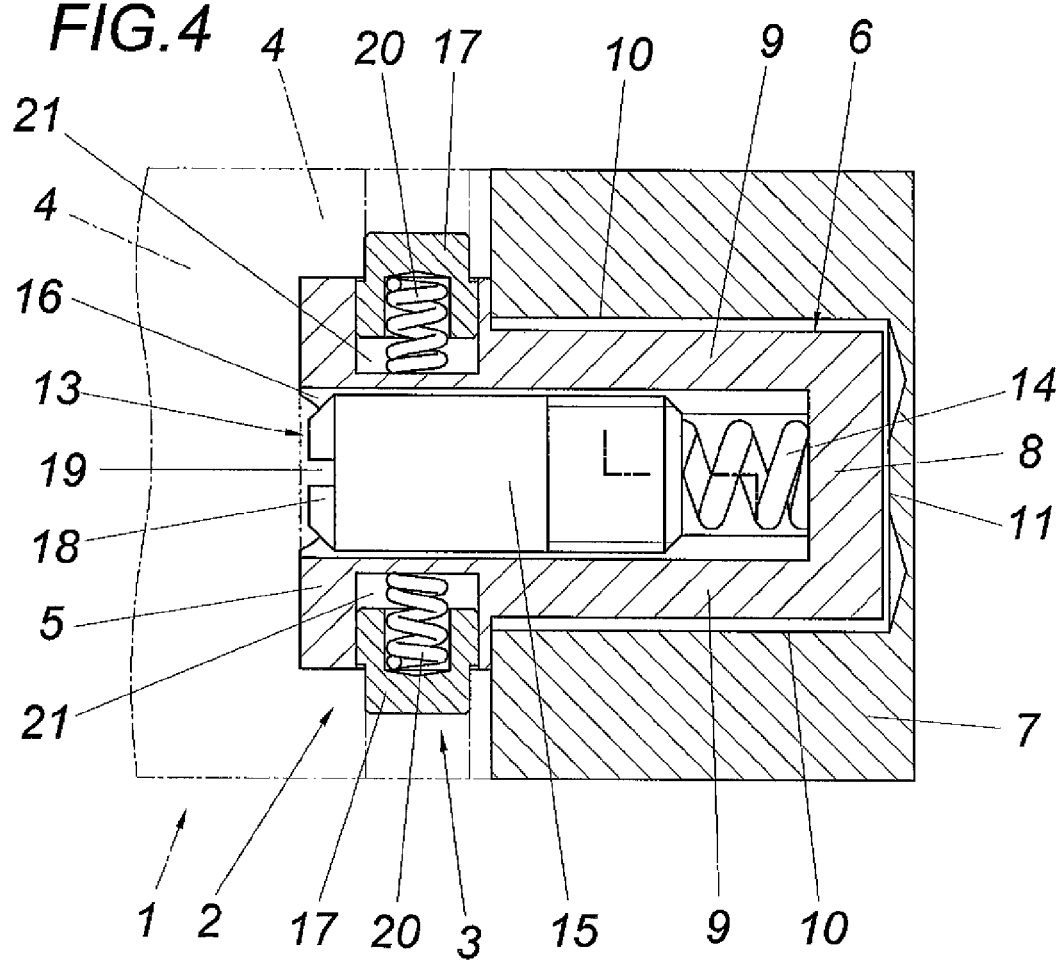
FIG. 4 shows an illustration of a constructional variant of a spring hinge in accordance with the invention corresponding to FIG. 2.

The embodiment according to FIG. 4 differs from the spring hinge according to FIGS. 1 to 3 merely by the arrangement of the hinge axis 3, because the two axial stubs 17 in the middle hinge lobe 5 are held in an axially displaceable manner and are pressurized by the coiled springs 20, so that they can be slid against the force of the coiled springs 20 by their excess portion length into the guide recesses 21. In this mounting position, the middle hinge lobe 5 of the one hinge part 2 can be introduced into the bearing bracket 4 of the other hinge part 1 until the spring-pressurized axial stubs 17 reach the bearing recesses in the bearing bracket 4 and are pushed out into them, whereupon mounting is completed.

The invention is obviously not limited to the illustrated embodiments. The arrangement of the coiled spring 14 between two legs 9 of the sliding element 6 is not mandatory because it is only relevant to support the coiled spring 14 on the sliding element 6 at its end facing away from the hinge axis 3, which merely requires a respective support web of the sliding element 6.

The invention claimed is:

1. A spring hinge device for spectacles, the spring hinge device comprising:
   a first hinge part comprising a sliding element defining a through opening and a web,
   a second hinge part forming a bearing bracket for the first hinge part,
   a hinge axis connecting the first hinge part and the second hinge part,
   a housing, the sliding element of the first hinge part being displaceably guided in the housing such that the housing at least partially houses the first hinge part,
   a coiled spring having a first end and a second end, said first end resting on the web of the sliding element, and
   an abutment inserted into the through opening in the first hinge part and fixed to the housing, said abutment, comprising a sleeve receiving the second end of the coiled spring, and protruding beyond the housing into a region of the hinge axis,
   wherein the second end of the coiled spring rests on the abutment, and
   wherein the sliding element is disposed in the housing coaxially to the coiled spring.

2. The spring hinge device according to claim 1, wherein the hinge axis comprises a first axial stub and a second axial stub, and
   wherein the sleeve of the abutment protrudes into a region between the first axial stub and the second axial stub.

3. The spring hinge device according to claim 2, wherein the hinge axis comprises a first spring and the first axial stub is disposed on the first spring,
   wherein the hinge axis comprises a second spring and the second axial stub is disposed on the second spring,
   wherein the first and second axial stubs are axially displaceably mounted in the first hinge part and are displaceable in a direction towards one another against the force of the first spring and against the force of the second spring into an inserted mounting position,
   wherein the bearing bracket of the second hinge part comprises a first bearing recess and a second bearing recess,
   wherein in the inserted mounting position the first hinge part is introduced into the bearing bracket of the second hinge part in order to mount the first hinge part and the second hinge part in a mounted position, and
   wherein in the mounted position the first axial stub protrudes into the first bearing recess and the second axial stub protrudes into the second bearing recess.

4. The spring hinge device according to claim 1, wherein the housing comprises a female thread coaxial to the coiled spring, and
   wherein the sleeve of the abutment is screwed into the female thread of the housing.

\* \* \* \* \*

UNITED STATES PATENT AND TRADEMARK OFFICE
CERTIFICATE OF CORRECTION

PATENT NO.         : 8,533,913 B2
APPLICATION NO.    : 13/366451
DATED              : September 17, 2013
INVENTOR(S)        : Buchegger et al.

It is certified that error appears in the above-identified patent and that said Letters Patent is hereby corrected as shown below:

In the Claims:

Column 4, line 19 (line 15 of Claim 1) after the word "abutment" please delete:   ",".

Signed and Sealed this
Tenth Day of December, 2013

Margaret A. Focarino
*Commissioner for Patents of the United States Patent and Trademark Office*